(12) United States Patent
Almasi et al.

(10) Patent No.: US 10,936,323 B2
(45) Date of Patent: Mar. 2, 2021

(54) OPTIMIZE CONTROL-FLOW CONVERGENCE ON SIMD ENGINE USING DIVERGENCE DEPTH

(71) Applicant: International Business Machines Corporation, Armonk, NY (US)

(72) Inventors: Gheorghe Almasi, Ardsley, NY (US); Jose Moreira, Irvington, NY (US); Jessica H. Tseng, Fremont, CA (US); Peng Wu, Rochester, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/439,210

(22) Filed: Jun. 12, 2019

(65) Prior Publication Data
US 2019/0294444 A1 Sep. 26, 2019

Related U.S. Application Data

(63) Continuation of application No. 15/890,548, filed on Feb. 7, 2018, now Pat. No. 10,379,869, which is a
(Continued)

(51) Int. Cl.
*G06F 9/40* (2006.01)
*G06F 9/52* (2006.01)
(Continued)

(52) U.S. Cl.
CPC .............. *G06F 9/3887* (2013.01); *G06F 8/41* (2013.01); *G06F 8/453* (2013.01); *G06F 8/458* (2013.01);
(Continued)

(58) Field of Classification Search
CPC .. G06F 9/3887; G06F 9/3851; G06F 9/30058; G06F 9/30065; G06F 9/325;
(Continued)

(56) References Cited

U.S. PATENT DOCUMENTS 5,045,995 A    9/1991  Levinthal et al.
5,430,854 A    7/1995  Sprague et al.
(Continued)

FOREIGN PATENT DOCUMENTS

WO    WO2005086017 A1    9/2005

OTHER PUBLICATIONS

List of IBM Patents or Patent Applications Treated as Related.

*Primary Examiner* — Daniel H Pan
(74) *Attorney, Agent, or Firm* — Scully, Scott, Murphy & Presser, P.C.; Vazken Alexanian

(57) ABSTRACT

There are provided a system, a method and a computer program product for selecting an active data stream (a lane) while running Single Program Multiple Data code on a Single Instruction Multiple Data machine. The machine runs an instruction stream over input data streams and machine increments lane depth counters of all active lanes upon the thread-PC reaching a branch operation and updates the lane-PC of each active lane according to targets of the branch operation. An instruction of the instruction stream includes a barrier indicating a convergence point for all lanes to join. In response to a lane reaching a barrier: evaluating whether all lane-PCs are set to a same thread-PC; and if the lane-PCs are not set to the same thread-PC, selecting an active lane from the plurality of lanes; otherwise, incrementing the lane-PCs of all the lanes, and then selecting an active lane from the plurality of lanes.

17 Claims, 8 Drawing Sheets

Related U.S. Application Data continuation of application No. 14/468,904, filed on Aug. 26, 2014, now Pat. No. 9,952,876.

(51) Int. Cl.
| | |
|---|---|
| *G06F 15/80* | (2006.01) |
| *G06F 9/38* | (2018.01) |
| *G06F 8/41* | (2018.01) |
| *G06F 9/30* | (2018.01) |
| *G06F 9/32* | (2018.01) |

(52) U.S. Cl.
CPC ............ *G06F 9/3851* (2013.01); *G06F 15/80* (2013.01); *G06F 15/8023* (2013.01); *G06F 8/443* (2013.01); *G06F 8/452* (2013.01); *G06F 9/30058* (2013.01); *G06F 9/30065* (2013.01); *G06F 9/325* (2013.01); *G06F 9/3885* (2013.01); *G06F 15/8007* (2013.01)

(58) Field of Classification Search
CPC ........ G06F 9/3885; G06F 9/324; G06F 9/522; G06F 8/41; G06F 8/453; G06F 8/458; G06F 8/443; G06F 8/452; G06F 15/80; G06F 15/8023; G06F 15/8007
USPC ................... 712/22, 230–248; 717/140–161
See application file for complete search history.

(56) References Cited

U.S. PATENT DOCUMENTS

| | | | |
|---|---|---|---|
| 5,555,428 A | 9/1996 | Radigan et al. | |
| 5,850,543 A | 12/1998 | Shiell et al. | |
| 7,353,369 B1 | 4/2008 | Coon et al. | |
| 7,543,136 B1 | 6/2009 | Coon et al. | |
| 7,617,384 B1 | 11/2009 | Coon et al. | |
| 7,761,697 B1 | 7/2010 | Coon et al. | |
| 7,877,585 B1 | 1/2011 | Coon et al. | |
| 7,904,905 B2* | 3/2011 | Cervini | G06F 9/4843 712/10 |
| 9,952,876 B2* | 4/2018 | Almasi | G06F 9/3887 |
| 10,379,869 B2* | 8/2019 | Almasi | G06F 8/458 |
| 2005/0289329 A1 | 12/2005 | Dwyer et al. | |
| 2006/0101256 A1 | 5/2006 | Dwyer et al. | |
| 2008/0114975 A1 | 5/2008 | Yen | |
| 2013/0061027 A1 | 3/2013 | Chen et al. | |
| 2013/0166886 A1 | 6/2013 | Sasanka et al. | |
| 2013/0179662 A1 | 7/2013 | Choquette et al. | |
| 2013/0332937 A1* | 12/2013 | Gaster | G06F 9/5072 718/104 |
| 2014/0149710 A1* | 5/2014 | Rogers | G06F 9/3851 711/170 |
| 2014/0365752 A1* | 12/2014 | Howes | G06F 9/3851 712/233 |
| 2016/0019066 A1 | 1/2016 | Diamos et al. | |
| 2016/0132338 A1 | 5/2016 | Jin | |

\* cited by examiner

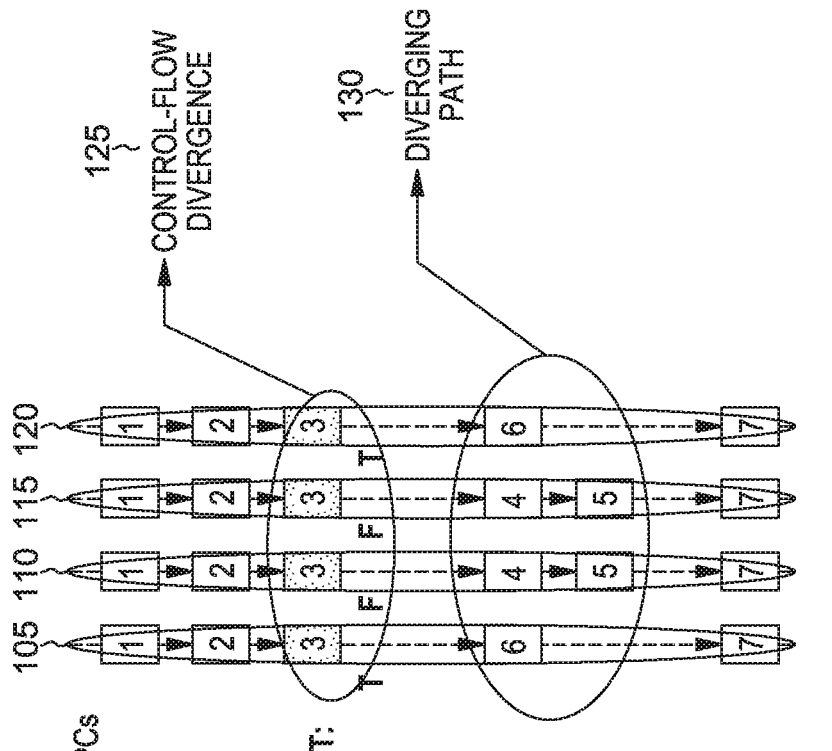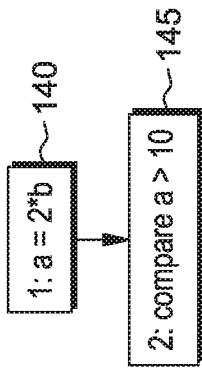

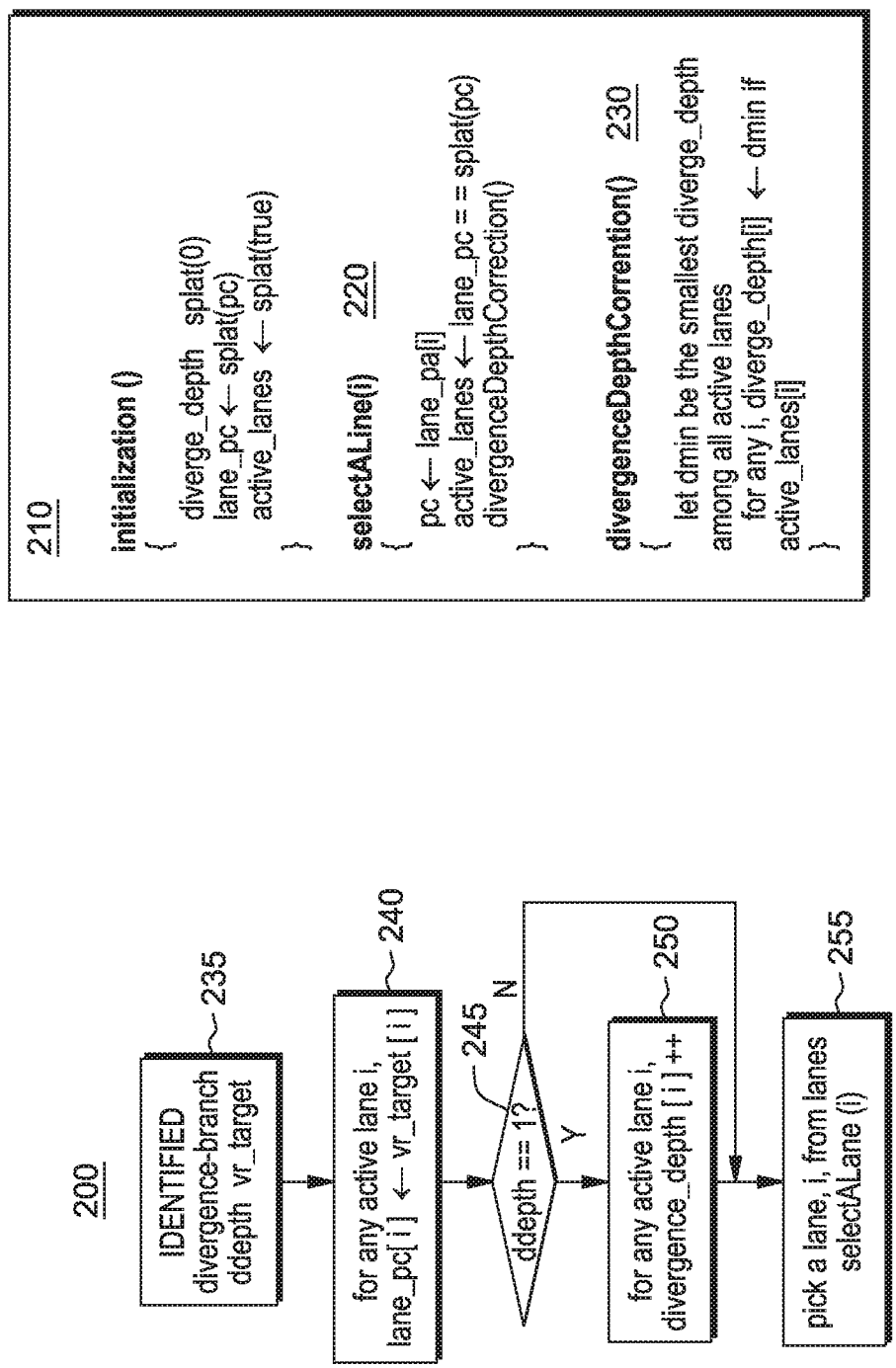

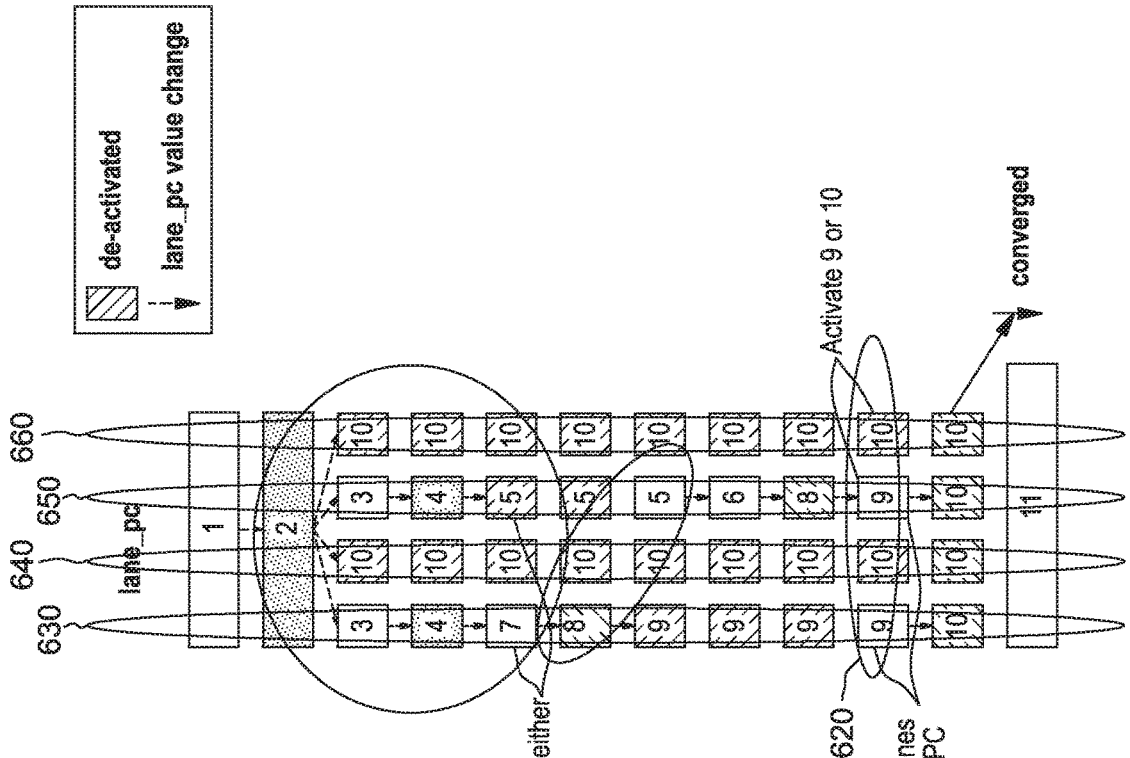
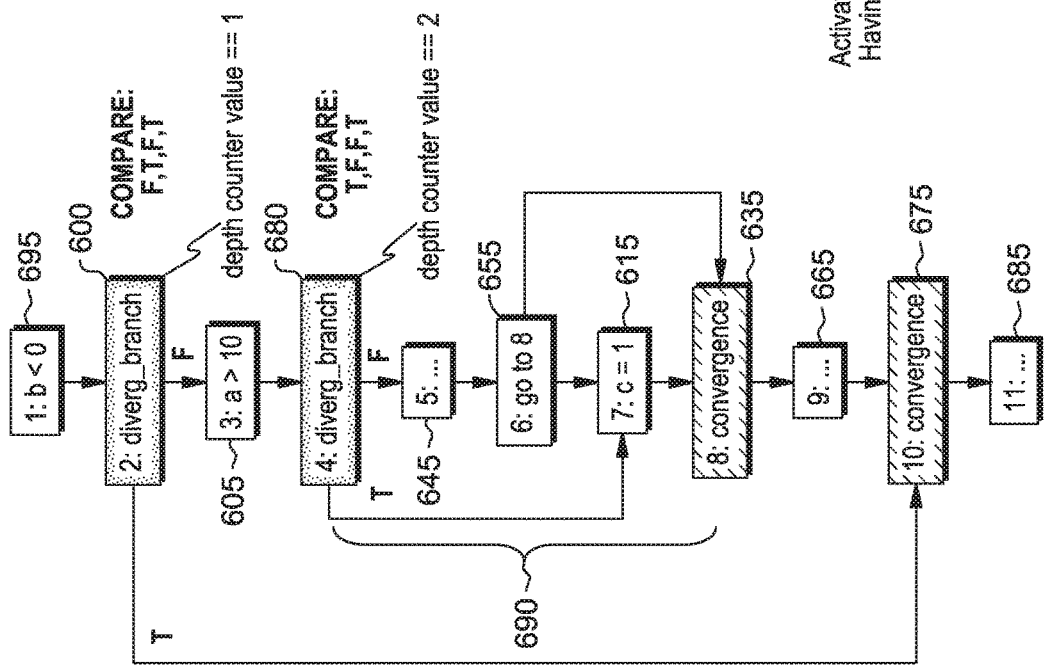

OPTIMIZE CONTROL-FLOW CONVERGENCE ON SIMD ENGINE USING DIVERGENCE DEPTH

FIELD OF INVENTION

This disclosure relates generally to SIMD (Single Instruction Multiple Data) or SPMD (Single Program Multiple Data) computing machines, and particularly to running an SPMD code on SIMD machine.

BACKGROUND OF THE INVENTION

Single Program Multiple Data (SPMD) refers to a parallel computing mechanism in which programs or tasks are split across a plurality of processors which are configured to operate on each different data. SPMD applies a scalar and sequential program ("SPMD kernel" or "SPMD code") simultaneously to multiple data streams. Examples of SPMD include, but are not limited to: OpenMP® (Open Multi-Processing), Fork-join, Pthread (POSIX (Portable Operating System Interface) Thread), Map-reduce, CUDA® (Compute Unified Device Architecture), OpenCL® (Open Computing Language), etc. An SPMD programming model includes running a plurality of software threads or software processes, each of which maintains its own program counter (PC) and states stored in its own register. Any control-flow operation in SPMD code (i.e., running the SPMD kernel as multiple instruction streams), when applied to multiple data streams, may produce multiple local PCs, which is called control-flow divergence. Control-flow divergence is a runtime behavior in a SPMD code, where PCs of multiple instruction streams of the SPMD code differ among themselves.

Single Instruction Multiple Data (SIMD) refers to a parallel computing mechanism in which a plurality of processors are configured to perform same operations on different data. Examples of SIMD machine includes, but is not limited to: AltiVec machine (i.e., a machine running AltiVec® (i.e., an instruction set designed for a SIMD machine)), VMX server (i.e., a server running Vintela Management Extensions (VMX)), SSE machine (i.e., machine running Streaming SIMD Extensions (SSE), which is an instruction set designed for SIMD machine), AVX machine (machine running Advanced Vector Extensions (AVX) instruction set), etc. A SIMD machine includes only one single PC (program counter). Each instruction stream (i.e., each processor) in SIMD machine is called a lane. Running of instructions on lanes on a SIMD machine is controlled by a predication mask. The predication mask indicates for each lane whether the lane is active for the PC being run or not. When a lane is active, the current PC is run on the lane, otherwise it is not. The predication mask of a SIMD machine can be updated as the result of other machines instructions such as compare, register move, or branch.

SUMMARY

There are provided a system, a method and a computer program product to run SPMD (Single Program Multiple Data) code with diverging control-flow on a SIMD (Single Instruction Multiple Data) machine. The SIMD machine runs an instruction stream which has one thread-PC (Program Counter) over multiple streams of input data. The thread-PC indicates an instruction memory address which stores an instruction to be fetched next for the instruction stream. The SIMD machine runs the instruction stream over multiple input data streams ("lanes"). Each lane is associated with a lane depth counter, a lane-PC to indicate the next instruction to be run on the lane, and a lane activation bit to indicate whether the instruction referred to by the thread-PC is active on this lane or not. The SIMD machine increments lane depth counters of all active lanes upon the thread-PC reaching a branch operation in the instruction stream. The SIMD machine updates the lane-PC of each active lane according to targets of the branch operation. An instruction of the instruction stream comprises a barrier indicating a convergence point for all lanes to join, the SIMD machine being further configured to: determining a lane reaching a barrier instruction; and in response to the SIMD machine determining a lane reaching a barrier instruction: evaluating whether lane-PCs of all the lanes are set to a same thread-PC; and if the lane-PCs of all the lanes are not set to the same thread-PC, selecting an active lane from the plurality of lanes; otherwise, if the lane-PCs of all the lanes are set to the same thread-PC, incrementing the lane-PCs of all the lanes, and then selecting an active lane from the plurality of lanes.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 1A illustrates an example pseudo-code for depicting an example control-flow divergence in one embodiment;

FIG. 1B illustrates an example control-flow divergence in one embodiment;

FIGS. 2A-2B illustrate semantics of divergence branch in one embodiment;

FIG. 6A illustrates example SPMD (Single Program Multiple Data) code in one embodiment; FIG. 6B illustrates example lanes corresponding to the example SPMD code shown in FIG. 6A in one embodiment;

DETAILED DESCRIPTION

Figure 7:
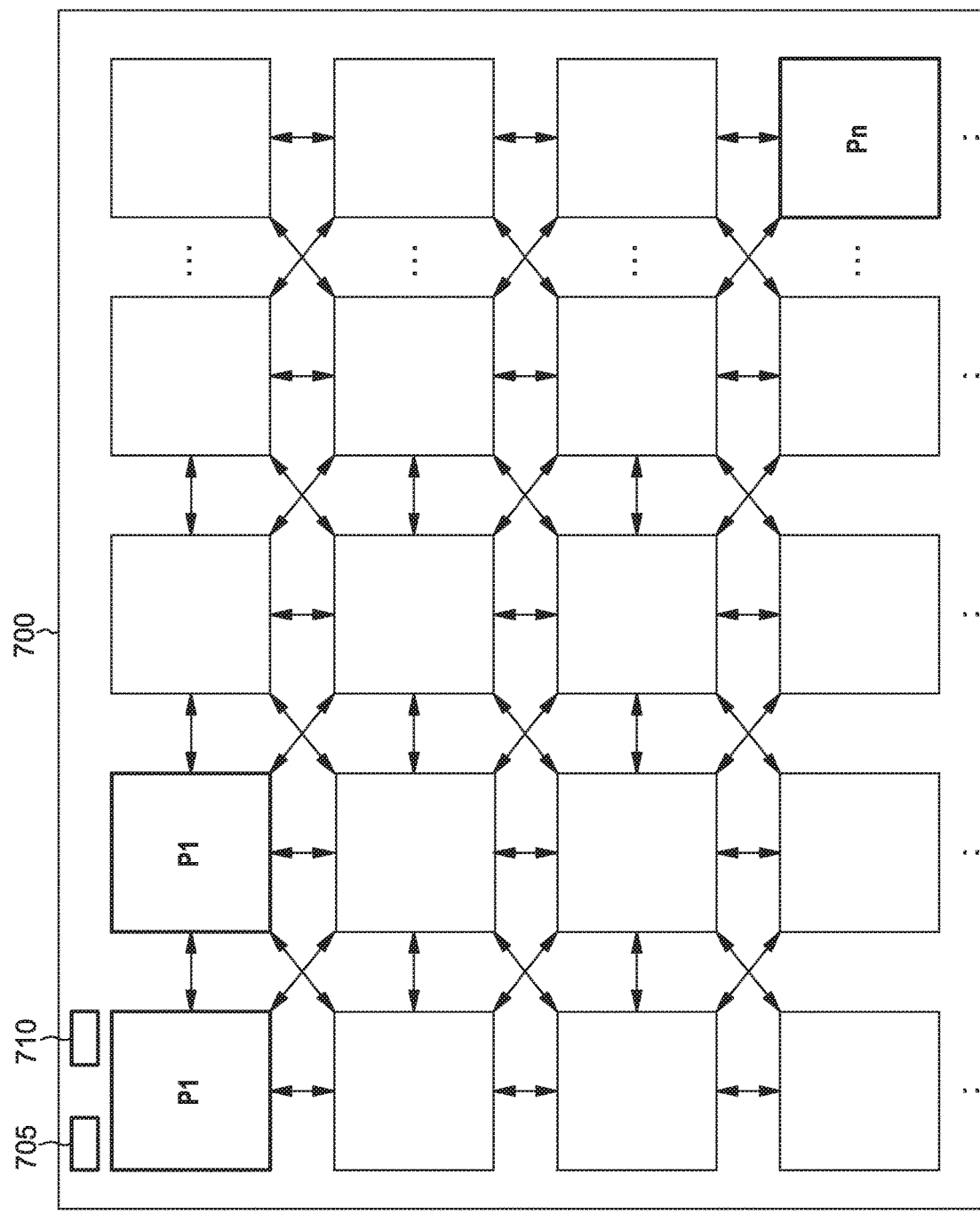
FIG. 7 illustrates example computing systems that run methods shown in FIG. 8 in one embodiment.
Figure 8:
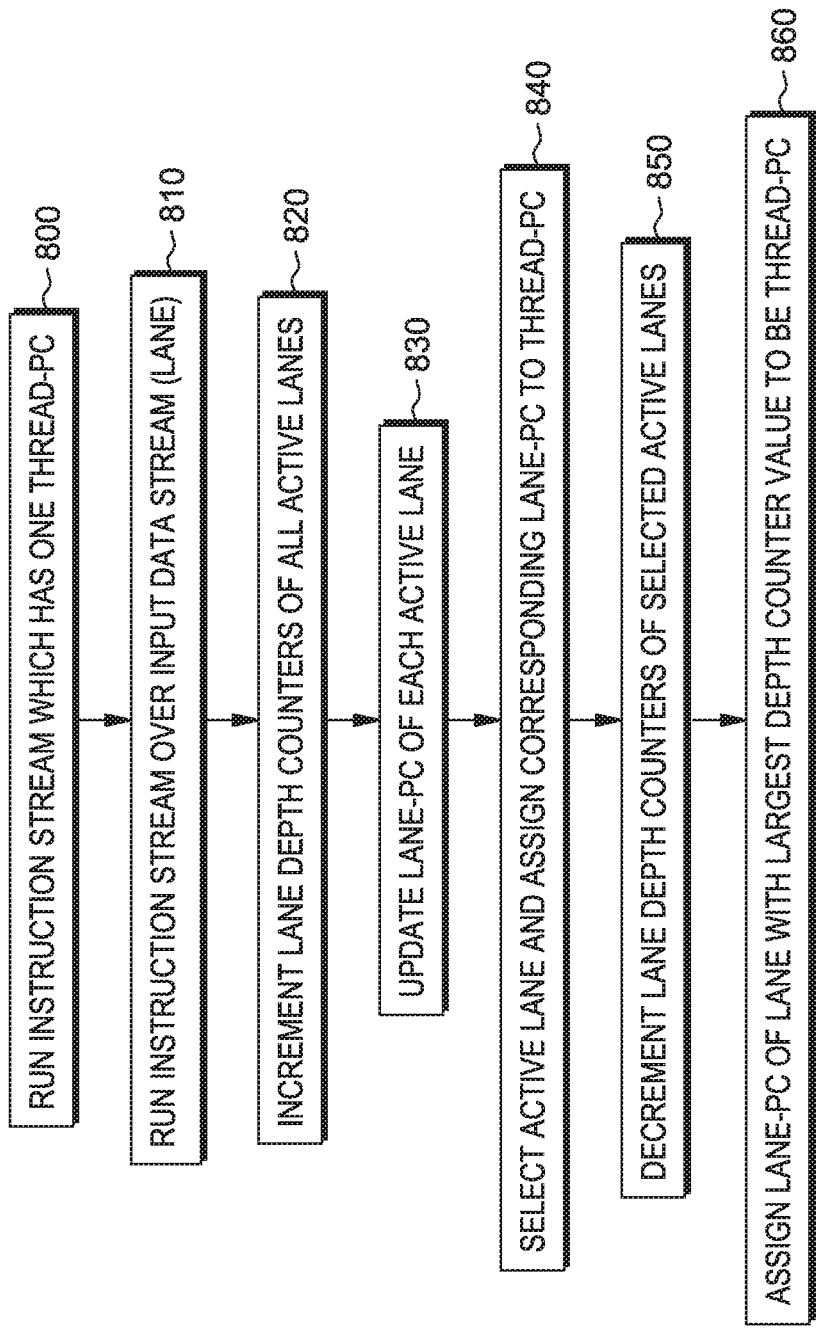
FIG. 8 illustrates a flowchart that depicts method steps for implementing control-flow divergence in a SIMD machine in one embodiment.

In one embodiment, a SIMD machine, e.g., SIMD machine 700 shown in FIG. 7, optimizes running of SPMD code in the presence of the control-flow divergence, e.g., by running method steps shown in FIG. 8. The SIMD machine 700 shown in FIG. 7 includes a plurality of processors, P1, P2, etc. The SIMD machine 700 includes at least two different registers, for example, 705 and 706, etc. A principle of supporting the SPMD code on the SIMD machine is to come up with a mechanism to use a single thread-PC (Program Counter), associated with the SIMD machine, to run an instruction stream over multiple data streams 105-120 shown in FIG. 1B. A thread-PC indicates an instruction memory address to be run next. A lane is a data stream among a plurality of data streams. A lane activation bit indicates whether a corresponding lane is active or not. A lane-PC indicates an instruction address to be run on a lane when the lane is activated. A lane depth counter is an integer counter associated with each lane. A lane depth counter indicates the number of nested branch for each corresponding lane.

In FIG. 1B, a control-flow divergence 125 is defined at a corresponding branch condition 3 of the SPMD code 100 shown in FIG. 1A. "T" represents that a branch condition is taken. "F" represents that a branch condition is not taken. Until the control-flow divergence 125, all the lanes 105-120 are active since all the lanes maintain same PCs (an instruction memory address of the instruction "1" (140)→an instruction memory address of the instruction "2" (145)→an instruction memory address of the instruction "3" (150)). From the control-flow divergence 125, SIMD machine may proceed running the SPMD code over each lane using a single thread-PC (Program Counter) 105-110, but each lane maintains a different lane-PC from a point (called diverging path 130) in each lane 105-120. Individual lane-PCs may or may not be the same as the thread-PC. For example, a first lane 105 may maintain a lane-PC as the memory address of the instruction "6" (165) and then the memory address of the instruction "7" (170). A second lane 110 may maintain a corresponding lane-PC as a memory address of the instruction "4" (155), a memory address of the instruction "5" (160), and a memory address of the instruction "7" (170). The SIMD machine may run one or more lanes whose lane-PCs are same in parallel in order to maximize the number of active lanes in the SIMD machine.

In one embodiment, one or more compiler of the SIMD machine generates code during compiling of the SPMD code to be run on the SIMD machine. The generated code includes, but is not limited to: a control-flow statement (i.e., an instruction code that activates or de-activates one or more lanes or that instructs the SIMD machine to switch a current active lane(s); convergence instruction, diverg_branch instruction, etc.). The advantage of generating and running of this code is that the SIMD machine maximizes the number of active lanes on the SIMD machine. This mechanism, i.e., generating and running of the control-flow statement, etc., maximizes the performance of the SIMD machine, e.g., by reducing the runtime of the SIMD machine or increasing the throughput of the SIMD machine. A value of a lane depth counter stores a depth of a (nested) branch of a corresponding lane which assumes that a corresponding branch condition(s) is taken or not taken.

One of the control-flow statements is convergence that initiates to the SIMD machine that one or more diverging control-flow paths (as the result of a previous divergent branch) will converge at this point (i.e., at the convergence instruction). With this information, the SIMD machine starts to run the SPMD code over a different lane which is selected upon the SIMD machine running the convergence instruction. The selected lane may include a largest depth counter value among all the lanes. The compiler of the SIMD machine inserts one or more convergence instructions into SPMD program. By running the convergence instructions, the SIMD machine decides which lane(s) to switch to, in order to minimize running time of the SPMD code. Once the SIMD machine reaches at a convergence instruction in SPMD code the SIMD machine may activate one or more lanes to run a next instruction in the SPMD code over the activated lanes.

The SIMD machine includes a register called diverg_depth (also called "lane depth counter register") which is incremented upon the instruction reaches at diverg_branch ddepth vr_target) that helps select one or more lanes upon the SIMD machine reaching the convergence instruction in SPMD code. The diverg_depth register stores for a corresponding lane a depth of a (nested) branch of the corresponding lane which assumes that a corresponding branch condition(s) is taken or not taken. Upon SIMD machine processing reaching the convergence instruction, the SIMD machine switches to the lane(s) with the largest divergence depth (i.e., a largest diverg_depth counter register value). A diverg_branch ddepth vr_target operation allows a selective increment of diverg_depth when running a branch condition clause based on the value of ddepth: if the value of ddepth is a positive value, e.g., one, a diverg_depth counter register value of a corresponding lane is increased by the positive value. If the value of ddepth is zero, the diverg_depth counter register value is neither decreased nor increased. In one embodiment, if the value of ddepth is a negative value, e.g., −1, a diverg_depth counter register value of a corresponding lane is decreased by the absolute value of that negative value. vr_target is a SIMD machine register. For an instruction stream i, the SIMD machine branches to an instruction memory address stored in vr_target.

Another control-flow statement (instruction) is called convergence, which when processed the SIMD machine switches a currently active lane(s), e.g., by activating another lane that minimizes average inactive lanes during the running of the SIMD machine or by continuously activating the currently active lane(s).

Figure 5:
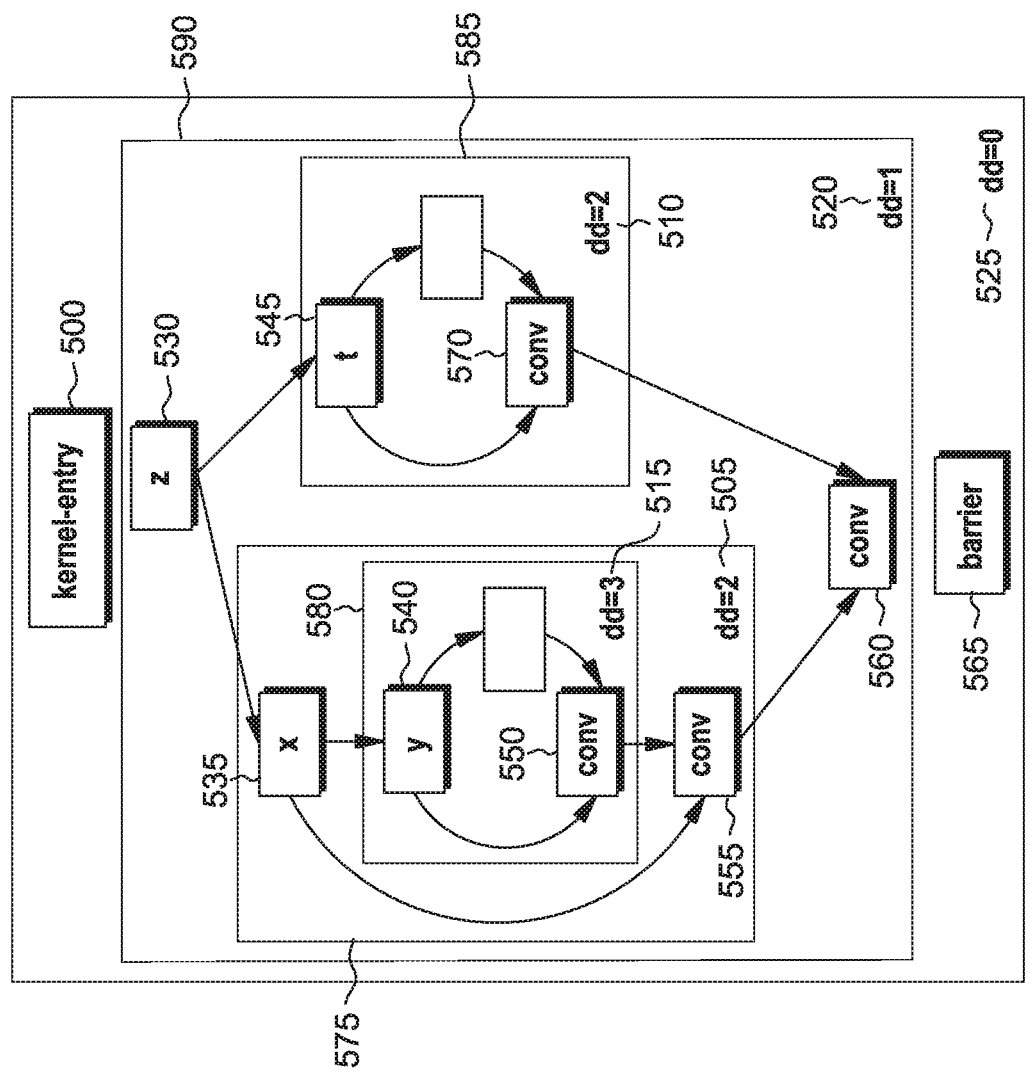
FIG. 5 illustrates an example of divergent regions and divergence depths in one embodiment.

In one embodiment, upon reaching at a convergence instruction, the SIMD machine selects a lane whose divergence depth (i.e., the difference between the lane-PC of an active lane and the instruction memory address of convergence instruction) is the largest. The SIMD machine activates the selected lane and may deactivate other lanes. Another control-flow statement (instruction) is called barrier which indicates a mandatory convergence point for which all lanes join. Barrier may be placed at an entry point of the SPMD code and/or at the end of the SPMD code as shown in FIG. 5. In a further embodiment, the compiler of the SIMD machine generates diverg_branch, convergence and barrier instructions. In this embodiment, there are provided at least three different registers: a register called diverg_depth, which stores divergence depth for each lane, a register called lane_pc, which stores a memory address which stores an instruction to be fetched next when the lane is activated for a corresponding lane, and a register called active_lanes, which indicates lanes being activated to run the instruction stream.

FIG. 8 illustrates a flowchart that describes method steps to handle control-flow divergence (e.g., control-flow divergence 125 shown in FIG. 1—a branch operation) in a SIMD machine in one embodiment. The SIMD machine initializes values of lane depth counters of all the lanes to zero. The SIMD machine initializes lane-PCs of all the lanes to the thread-PC and activate all lanes. At 800, the SIMD machine runs an instruction stream which has one thread-PC over multiple streams of input data. The thread-PC indicates an instruction memory address which stores an instruction to be fetched next for the instruction stream. At 810, the SIMD machine runs the instruction specified by the Thread-PC over all active lanes.

At 820, the SIMD machine incrementing lane depth counters of all active lanes upon the thread-PC reaching a branch operation. At 830, the SIMD machine updates the lane-PC of each active lane according to targets of the branch operation. For example, as shown in FIG. 1A, lane-PCs of first and third lanes take the instruction memory address of the instruction "4" (155) upon assuming that the branch operation is not taken. As shown in FIG. 1A, lane-PCs of second and fourth lanes take the instruction memory address of the instruction "6" (165) upon assuming that the branch operation is taken. At 840, the SIMD machine selects a lane and assigns the lane-PC of the selected lane to the thread-PC, and activates only lanes whose lane-PC matches the thread-PC. In one embodiment, the SIMD machine selects and activates a lane whose lane depth counter value is the largest. In another embodiment, at 840, the SIMD may randomly select a lane to activate to run the instruction stream over the randomly selected lane. At 850, the SIMD machine decrements values of corresponding lane depth counters of active lanes when the instruction stream reaches a particular instruction, e.g., the convergence instruction. At 860, the SIMD machine assigns the lane-PC of the selected lane with the largest lane depth counter value to be the thread-PC and activates all lanes whose lane-PCs match the thread-PC.

There is provided at least two different convergence instruction placement algorithms: (1) splitting a branch condition clause into two or more diverg_branch instructions as shown FIG. 4 which is described below in detail; and (2) a divergence depth error correction mechanism to correct imprecise divergence depth computations as described in pseudo code 230 shown in FIG. 2B which is described in detail below.

FIG. 2A illustrates a flowchart 200 that describes method steps for selecting a lane which becomes an active lane over which the instruction stream is run by the SIMD machine. FIG. 2A corresponds to step 840 in FIG. 8. As shown in pseudo code 210 of FIG. 2A, the SIMD machine initializes the SIMD machine as follows: (1) the SIMD machine sets all the values of the diverge_depth counter registers to zero (i.e., divergence depth is set to zero across all the lanes); (2) lane-PCs of all lanes are set to the thread-PC; and (3) all lanes to be run over the SPMD code become active to run the SPMD code.

At 235, the SIMD machine runs the diverg_branch ddepth vr_target instruction which may be placed in the SPMD code. At 240, a lane-PC of any active lane is set to a branch target address. At 245, the SIMD machine evaluates whether a lane depth counter value of each active lane is one. At 250, if the lane depth counter value of the each active instruction is one, the SIMD machine increments the lane depth counter value of the each active lane. At 255 (also shown in pseudo code 220 of FIG. 2B), if the lane depth counter value of the each active lane is not one, the SIMD machine selects a lane whose value of the lane depth counter is the largest and activates the selected lane to be run over the SPMD code. The largest lane depth counter value may indicate that the selected lane may include a deepest nested branch.

In a further embodiment, the SIMD machine may run divergence depth correction as shown in pseudo code 230 of FIG. 2B. The divergence depth correction refers to that after activating the one or more lanes, the SIMD machine assigns a minimum value of lane depth counter values of all active lanes to the lane depth counters of all the active lanes.

Figures 3A, 3B, 3C:
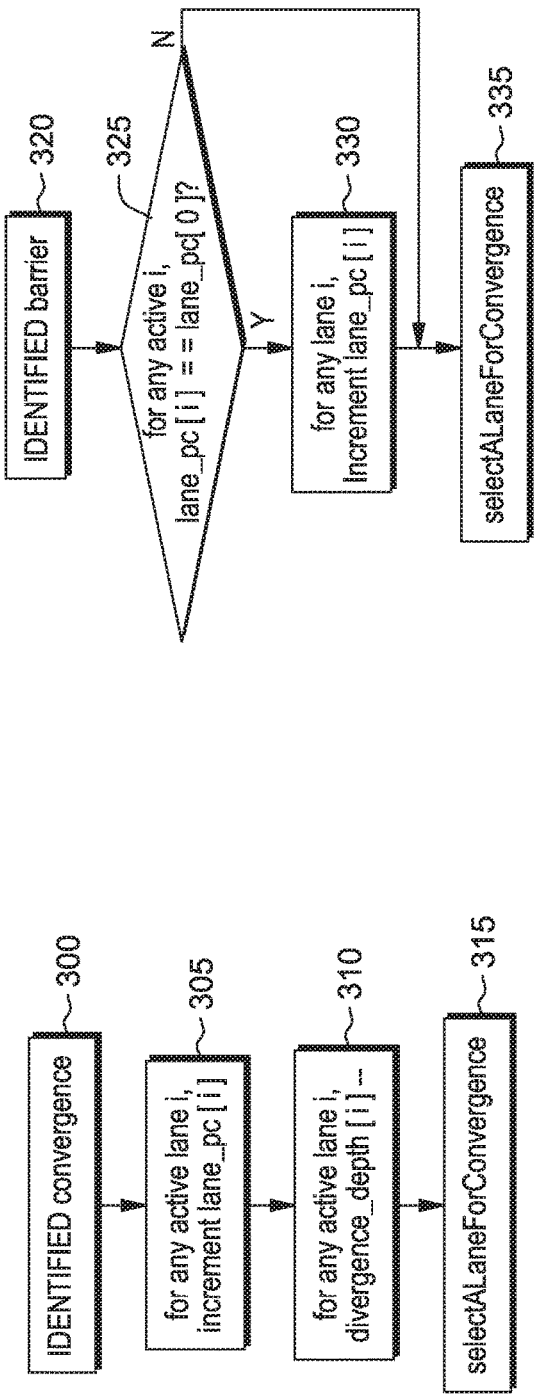
FIGS. 3A-3C illustrate semantics of convergence and barrier in one embodiment.

FIG. 3A illustrates a flowchart for selecting a lane upon the SIMD machine reaching at a convergence instruction. At 300, the SIMD machine reaches the convergence instruction. At 305, the SIMD machine increments the lane-PCs of all the active lanes. At 310, the SIMD machine decrements values of corresponding lane depth counters of all the active lanes. At 315, the SIMD machine selects a lane(s) to activate to run. FIG. 3B illustrates a flowchart for selecting a lane upon the SIMD machine reaching a barrier which may be an entry point (or an end point) of SPMD code. At 320, a lane reaches at a barrier instruction. At 325, the SIMD machine evaluates whether lane-PCs of all the lanes are set to a same PC (Program Counter). At 330, if the lane-PCs of all the lanes are set to the same PC, the SIMD machine increments the lane-PCs of all the lanes. If the lane-PCs of all the lanes are not set to the same PC, the SIMD machine selects a lane, e.g., according to the pseudo code shown in FIG. 3C which is described in detail below.

In a further embodiment, in order to select a lane at 315 and 335 in FIG. 3A, the SIMD machine runs pseudo code illustrated in FIG. 3C. According to the pseudo code shown in FIG. 3C, if all lanes of the SIMD machine reaches a convergence instruction, at 340-345, the SIMD machine resets lane depth counters of all the lanes to zero. While running the pseudo code 3C, the SIMD machine increments the lane depth counter values of corresponding lanes whenever the SIMD machine reaches convergence instruction. At 350, the SIMD machine activates all the lanes. At 355, if lane_pc of lanes do not store a barrier instruction, the SIMD machine selects a lane which includes the largest lane depth counter register value.

In one embodiment, a region (i.e., a basic code block from a single entry to a single exit) is called a divergence region in which an entry point is a branch condition or an entry point of SPMD program and an exit point is the convergence instruction. For any program point, x, a smallest divergence region is called a proper divergence region of x.

In this embodiment, the compiler of the SIMD machine replaces every conditional branch with diverg_branch ddepth=0 which resets corresponding lane depth counter register values of active lanes that reach this conditional branch to zero. The compiler of the SIMD machine replaces every indirect branch with diverg_branch ddepth=0 vr_targ which resets corresponding lane depth counter register values of active lanes that reach this conditional branch to zero and the lane-PCs of these lanes become the values stored in vr_targ register.

In this embodiment, for each divergence region with an entry point x and an exit point y, if x has an incoming edge, i.e., a feedback loop, within the region, the compiler of the SIMD machine may duplicate x into x and x' so that x is the entry point of the region and has no incoming edge from within the region. This duplication is called node-splitting which is described in detail below. At the entry point x, the compiler of the SIMD machine inserts diverg_branch ddepth=1 which increments lane depth counter values of active lanes by one. The compiler of the SIMD machine inserts a convergence instruction right before the exit point y. For each functional call or indirect function call, the compiler of the SIMD machine inserts diverg_branch ddepth=1 at the entry point of a corresponding function and inserts the convergence instruction at the exit point of the corresponding function.

Figure 4:
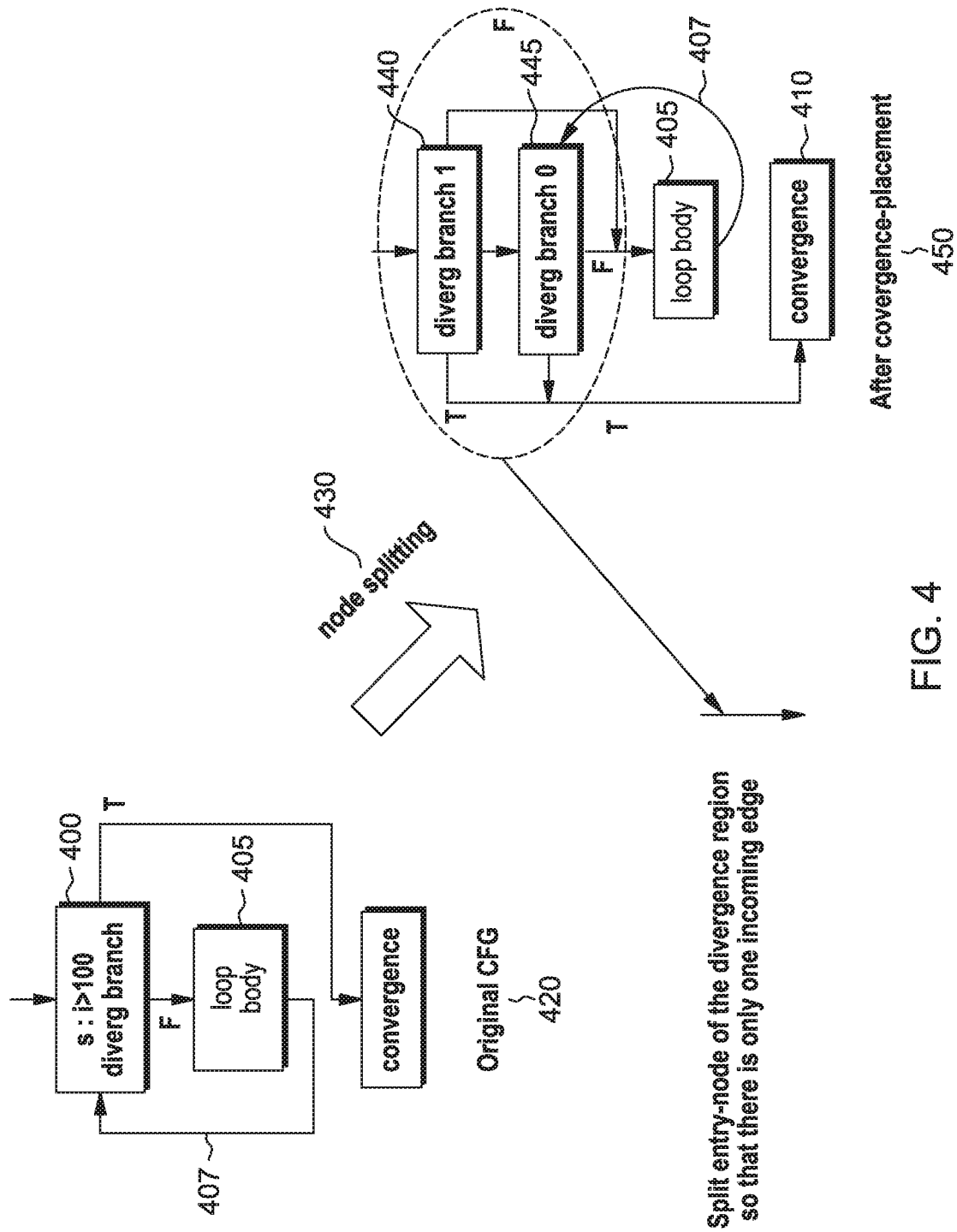
FIG. 4 illustrates an example splitting of a branch condition in one embodiment.

FIG. 4 illustrates an example of node-splitting. The SIMD machine splits 430 a branch condition 400 in an example original CFG (Control-Flow Graph) 420 into two or more instructions 440-445, i.e., diverg_branch ddepth=1 (440) and diverg_branch ddepth=0 (445). diverg_branch ddepth=1 instruction (440) increments a value of a lane depth counter of a corresponding active lane whose corresponding instruction stream has reached the diverg_branch ddepth=1 instruction (440). diverg_branch ddepth=0 instruction (445) obviates incrementing a value of a lane depth counter of a corresponding active lane whose corresponding instruction stream reaches at diverg_branch ddepth=0 instruction (445). At the end of each iteration of a loop 405, the compiler of the SIMD machine runs the diverg_branch ddepth=0 instruction (445). In both the original CFG 420 and a node-splitting CFG 450, there exists only one incoming edge 407. In the node-splitting CFG 450, the compiler of the SIMD machine directs the incoming edge ("backward branch") to the diverg_branch ddepth=0 instruction (445).

FIG. 5 illustrates example lane depth counter values. "z" (530), "x" (535), "y" (540) and "t" (545) are entry points of SPMD code 500. In this SPMD code 500, there are multiple nested loops: a first branch operation 590 (from an entry point 530 to an exit point 560)—upon an entry of the first branch operation, a lane depth counter value ("dd") of a corresponding active lane may become one (520), a second branch operation 575 (from an entry point 535 to an exit point 555)—upon an entry of the second branch 575, the lane depth counter value of the corresponding active lane may become two (505), a third branch operation 580 (from an entry point 540 to an exit point 550)—upon an entry of the third branch operation 580, the lane depth counter value of the corresponding lane may become three (515), a fourth branch operation 585 (from an entry point 545 to an exit point 570)—upon an entry of the fourth branch 585, a lane depth counter value of another corresponding active lane may become two (510). Upon all the lanes reaching at a barrier 565, lane depth counter values of all the lanes may become zero (525).

FIG. 6A illustrates example SPMD code 625. FIG. 6B illustrates corresponding example lanes 630, 640, 650 and 660. Upon reaching at a first branch operation "2: diverg_branch" 600, corresponding lane depth counter register values increment, for example, lane depth counter register values of all the lanes become 1. By assuming that the first branch operation 600 is taken ("T"), lane-PCs of the second lane 640 and the fourth lane 660 become an instruction memory address of an instruction "10: Convergence" (675). By assuming that the first branch operation 600 is not taken ("F"), lane-PCs of the first lane 630 and the third lane 650 become an instruction memory address of an instruction "3: a>10" (605).

Upon reaching at a second branch operation "4: diverg_branch" 680, lane depth counter values of the first and third lanes become two and the lane-PCs of the first and third lanes become each corresponding target of the second branch operation. By assuming that the second branch operation 680 is taken, the lane-PC of the first lane 630 becomes an instruction memory address of the instruction "7: c=1" (615). By assuming that the second branch operation 680 is not taken, the lane-PC of the third lane 650 becomes an instruction memory address of the instruction "5: . . . " (645).

When the SIMD machine runs the instruction "1: b<0" (695), the thread-PC(s) of the instruction stream 625 first takes the lane PCs of all the lanes 630, 640, 650 and 660. Then, the thread-PC of the instruction stream 625 takes a value of the lane-PC of the first and third lanes, i.e., an instruction memory address of the instruction 605, by assuming that the first branch operation 600 is not taken. Then, the thread-PC of the instruction stream 625 takes the lane PC value of the first and third lanes, i.e., instruction memory addresses of the instructions 605 and 680. Thereafter, the thread-PC of the instruction stream 625 takes the lane PC of the first lane 630, i.e., an instruction memory address of the instruction 615, by assuming that the second branch operation 680 is taken. Then, the thread-PC of the instruction 625 takes the lane-PC of the first lane 630, i.e., an instruction memory address of the instruction 635 which is a convergence instruction which can initiate the SIMD machine to switch a currently active lane (i.e., the first lane 630). Then by activating the third lane 650 and deactivating the first lane 630, the first thread-PC of the instruction stream 625 takes the lane-PC of the third lane 650, i.e., instruction memory addresses of the instructions "5: . . . " (645), followed by "6: goto 8" (655), and followed by "8: convergence" (635).) The instruction 635 is a convergence instruction at which the SIMD machine can activate another lane, e.g., the first lane 630, as well as the third lane 650 in order to run instructions 635, 665 and 675 over the first lane 630 and the third lane 650. Upon reaching the convergence instruction 635, lane depth counter values of all the active lanes decrement by one. At 620, the lane depth counter values of all the lanes become one. Since at 620 the largest lane depth counter value is one and all the lane depth counters' values are one, the SIMD machine activates all the lanes, i.e., lanes 630, 640, 650 and 660. Upon running the instruction "10: convergence" (675), the lane depth counter values of the all the lanes become zero. By running the instruction "10: convergence" (675), the SIMD machine activates all the lanes whose lane-PCs match with the thread-PCs which store an instruction memory address of the instruction 685.

Lane depth counter register values are computed at run-time and manipulated by both convergence and diverg_branch instructions. By running the convergence or diverg_branch instruction, the SIMD machine computes the lane depth counter register values of corresponding lanes, e.g., by incrementing whenever the instruction stream reaches at diverg_branch ddepth=1 instruction and decrementing whenever the instruction stream reaches at convergence instruction.

In one embodiment, the compiler of the SIMD machine places the convergence and diverg_branch instructions in SPMD code. The compiler of the SIMD machine replaces branch operations with diverg_branch instructions. By replacing each branch operation with a diverg_branch instruction, the compiler of the SIMD machine constructs CFG, e.g., SPMD code 625 shown in FIG. 6A. In the constructed CFG, the compiler of the SIMD machine inserts a convergence instruction at the end of each block (i.e., from an entry point indicated by diverg_branch instruction to an exit point indicated by convergence instruction) which includes more than one incoming edges where none are backward edges, e.g., a backward edge 407 shown in FIG. 4. In the constructed CFG, the compiler of the SIMD machine inserts the convergence instruction at the exit point of each function call. In a case of the lane depth counter overflow, the SIMD machine can run corresponding SPMD code correctly as the lane depth counter value is not a requirement for a correct computation of the SPMD code. The diverg_branch and convergence instructions are instructions for maximizing parallelism in the SIMD machine and do not impact computation correctness.

In one embodiment, upon reaching a diverg_branch instruction, the SIMD machine does not activate another lane, and the thread-PC of a corresponding instruction stream becomes a branch target stored in vr_target register. In this embodiment, upon meeting a convergence instruction, the thread-PC may become an instruction memory address stored in lane_pc register of a deactivated lane. The SIMD machine switches lanes depending on values in lane_pc and diverg_depth registers. In this embodiment, one or more operations in the SPMD code may overwrite register values of one or more lanes. Running of an instruction stream over one or more lanes may overwrite register values of other lanes.

FIG. 7 illustrates an example SIMD machine 700. The example SIMD machine may include, but are not limited to: a plurality of processors (P1, P2, . . . , Pn, . . . ) which are connected to each other. The SIMD machine may also include one or more shared memory devices (not shown). Each processor in the SIMD machine may include one or more processing cores (not shown) and one or more local memory devices (not shown).

In one embodiment, the methods shown in FIG. 10 may be implemented as hardware on a reconfigurable hardware, e.g., FPGA (Field Programmable Gate Array) or CPLD (Complex Programmable Logic Device), by using a hardware description language (Verilog, VHDL, Handel-C, or System C). In another embodiment, the method shown in FIG. 10 may be implemented on a semiconductor chip, e.g., ASIC (Application-Specific Integrated Circuit), by using a semi-custom design methodology, i.e., designing a semiconductor chip using standard cells and a hardware description language.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by a device that runs an instruction. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may run the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which run on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for selecting an active data stream while running a SPMD (Single Program Multiple Data) program of instructions on a SIMD (Single Instruction Multiple Data) machine, an instruction stream having one thread-PC (Program Counter), a value of the thread-PC indicating an instruction memory address which stores an instruction to be fetched next for the instruction stream, comprising:
running the instruction stream over a plurality of input data streams each of which corresponds to each of a plurality of lanes, each of the plurality of lanes being associated with a corresponding lane depth counter indicating a number of nested branches for each corresponding lane, a corresponding lane-PC of a lane of the plurality of lanes indicating a memory address which stores the instruction to be fetched next for the lane when the lane is activated, and a lane activation bit indicating whether the lane is active or not;
incrementing values of the lane depth counters of all active lanes of the plurality of lanes upon the thread-PC value reaching a branch operation in the instruction stream; and
updating the lane-PC value of each of the active lanes according to targets of the branch operation,
wherein an instruction of said instruction stream comprises a barrier indicating a convergence point for all lanes to join, the SIMD machine being configured to further perform determining a lane reaching a barrier instruction; and
in response to the SIMD machine determining a lane reaching a barrier instruction:
evaluating whether lane-PCs of all the active lanes are set to a same thread-PC; and
if the lane-PCs of all the active lanes are not set to the same thread-PC,
selecting an active lane from the plurality of active lanes;
otherwise, if the lane-PCs of all the lanes are set to the same thread-PC,
incrementing the lane-PCs of all the lanes, and then selecting an active lane from the plurality of lanes, the selecting the active lane from the plurality of lanes comprising:
determining whether all lanes of the SIMD machine reach a convergence instruction, and responsive to all lanes reaching a convergence instruction, resetting lane depth counter values of all the lanes to zero; and
activating one or more lanes.

2. The method according to claim 1, wherein the selecting an active lane from the plurality of lanes further comprises:
determining whether a lane-PC of a lane of the plurality of lanes indicates a memory address which stores the barrier; and
selecting a lane having a largest lane depth counter value from lanes having a lane PC that does not store a barrier instruction.

3. The method according to claim 1, wherein, while running the instruction stream, upon determining the SIMD machine reaching the convergence instruction;
incrementing the lane depth counter values of lanes corresponding to the convergence instruction.

4. The method according to claim 1, wherein the barrier instruction is one of: an entry point or an end point of the instruction stream.

5. The method according to claim 1, further comprising:
initializing the values of the lane depth counters of all of the plurality of lanes to zero;
initializing the values of the lane-PCs of all of the plurality of lanes to an instruction memory address; and
activating one or more lanes of the plurality of lanes whose lane-PC values are set to the instruction memory address.

6. The method according to claim 1, further comprising:
after activating one or more lanes of the plurality of lanes, assigning a minimum value of values of lane depth counters of all another active lanes of the plurality of lanes to the values of the lane depth counters of all the another active lanes.

7. The method according to claim 6, wherein another of the two second instructions specifies a positive increment value or a zero increment value.

8. The method according to claim 1, wherein the incrementing comprises:
splitting the branch operation into two second instructions and directing a backward branch to one of the two second instructions.

9. A system for selecting an active data stream while running a SPMD (Single Program Multiple Data) program of instructions on a SIMD (Single Instruction Multiple Data) machine, an instruction stream having one thread-PC (Program Counter), a value of the thread-PC indicating an instruction memory address which stores an instruction to be fetched next for the instruction stream, the system comprising:
a plurality of processors;
a memory device coupled to the plurality of processors, wherein the plurality of processors are configured to perform:
running the instruction stream over a plurality of input data streams each of which corresponds to each of a plurality of lanes, each of the plurality of lanes being associated with a corresponding lane depth counter indicating a number of nested branches for each corresponding lane, a corresponding lane-PC of a lane of the plurality of lanes indicating a memory address which stores the instruction to be fetched next for the lane when the lane is activated, and a lane activation bit indicating whether the lane is active or not;
incrementing values of the lane depth counters of all active lanes of the plurality of lanes upon the thread-PC value reaching a branch operation in the instruction stream; and
updating the lane-PC value of each of the active lanes according to targets of the branch operation,
wherein an instruction of said instruction stream comprises a barrier indicating a convergence point for all lanes to join, the plurality of processors being configured to further perform determining a lane reaching a barrier instruction; and in response to the plurality of processors determining a lane reaching a barrier instruction:
evaluating whether lane-PCs of all the active lanes are set to a same thread-PC; and
if the lane-PCs of all the active lanes are not set to the same thread-PC,
selecting an active lane from the plurality of active lanes;
otherwise, if the lane-PCs of all the lanes are set to the same thread-PC,
incrementing the lane-PCs of all the lanes, and then
selecting an active lane from the plurality of lanes, the selecting the active lane from the plurality of lanes comprising:
determining whether all lanes of the SIMD machine reach a convergence instruction, and responsive to all lanes reaching a convergence instruction, resetting lane depth counter values of all the lanes to zero; and
activating one or more lanes.

10. The system according to claim 9, wherein the selecting an active lane from the plurality of lanes further comprises:
determining whether a lane-PC of a lane of the plurality of lanes indicates a memory address which stores the barrier; and
selecting a lane having a largest lane depth counter value from lanes having a lane PC that does not store a barrier instruction.

11. The system according to claim 9, wherein, while running the instruction stream, upon determining the SIMD machine reaching the convergence instruction;
incrementing the lane depth counter values of lanes corresponding to the convergence instruction.

12. The system according to claim 9, wherein the barrier instruction is one of: an entry point or an end point of the instruction stream.

13. The system according to claim 9, wherein the plurality of processors are further configured to perform:
incrementing the values of the lane depth counters of all of the active lanes of the plurality of lanes when the instruction stream reaches a second instruction.

14. The system according to claim 9, wherein in order to perform the running, the plurality of processors are further configured to perform:
initializing the values of the lane depth counters of all of the plurality of lanes to zero;
initializing the values of the lane-PCs of all of the plurality of lanes to an instruction memory address; and
activating one or more lanes of the plurality of lanes whose lane-PC values are set to the instruction memory address.

15. A computer program product for selecting an active data stream while running a SPMD (Single Program Multiple Data) program of instructions on a SIMD (Single Instruction Multiple Data) machine, an instruction stream having one thread-PC (Program Counter), a value of the thread-PC indicating an instruction memory address which stores an instruction to be fetched next for the instruction stream, the computer program product comprising a non-transitory computer readable storage medium readable by a machine and storing instructions run by the machine to perform a method, said method steps comprising:
running the instruction stream over a plurality of input data streams each of which corresponds to each of a plurality of lanes, each of the plurality of lanes being associated with a corresponding lane depth counter indicating a number of nested branches for each corresponding lane, a corresponding lane-PC of a lane of the plurality of lanes indicating a memory address which stores the instruction to be fetched next for the lane when the lane is activated, and a lane activation bit indicating whether the lane is active or not;
incrementing values of the lane depth counters of all active lanes of the plurality of lanes upon the thread-PC value reaching a branch operation in the instruction stream; and
updating the lane-PC value of each of the active lanes according to targets of the branch operation,
wherein an instruction of said instruction stream comprises a barrier indicating a convergence point for all lanes to join, the SIMD machine being configured to further perform determining a lane reaching a barrier instruction; and
in response to the SIMD machine determining a lane reaching a barrier instruction:
evaluating whether lane-PCs of all the active lanes are set to a same thread-PC; and
if the lane-PCs of all the active lanes are not set to the same thread-PC,
selecting an active lane from the plurality of active lanes;
otherwise, if the lane-PCs of all the lanes are set to the same thread-PC,
incrementing the lane-PCs of all the lanes, and then
selecting an active lane from the plurality of lanes, the selecting the active lane from the plurality of lanes comprising:
determining whether all lanes of the SIMD machine reach a convergence instruction, and responsive to all lanes reaching a convergence instruction, resetting lane depth counter values of all the lanes to zero; and
activating one or more lanes.

16. The computer program product according to claim 15, wherein the selecting an active lane from the plurality of lanes further comprises:
determining whether a lane-PC of a lane of the plurality of lanes indicates a memory address which stores the barrier; and
selecting a lane having a largest lane depth counter value from lanes having a lane PC that does not store a barrier instruction.

17. The computer program product according to claim 15, wherein, while running the instruction stream, upon determining the SIMD machine reaching the convergence instruction;
incrementing the lane depth counter values of lanes corresponding to the convergence instruction.

* * * * *